US008738192B2

(12) United States Patent
Uphues et al.

(10) Patent No.: US 8,738,192 B2
(45) Date of Patent: May 27, 2014

(54) METHODS FOR OPERATING A WIND TURBINE

(71) Applicant: General Electric Company, Schenectady, NY (US)

(72) Inventors: Ulrich Uphues, Hanover (DE); Craig Leonard Christenson, Tehachapi, CA (US); Donald Rogers, Tehachapi, CA (US); Peter Gregg, Niskayuna, NY (US); Henk-Jan Kooijman, Al Enschede (NL); Ryan LeClair, Wilton, NY (US); Thomas Siebers, Neuenkirchen (DE); Frank T. Ormel, Hengelo (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/720,441

(22) Filed: Dec. 19, 2012

(65) Prior Publication Data

US 2013/0108443 A1 May 2, 2013

Related U.S. Application Data

(62) Division of application No. 11/551,884, filed on Oct. 23, 2006, now abandoned.

(51) Int. Cl.

| *B64C 11/30* | (2006.01) |
| *F01D 7/00* | (2006.01) |
| *F03D 7/00* | (2006.01) |
| *G05B 11/01* | (2006.01) |
| *G05D 17/00* | (2006.01) |
| *G05F 1/10* | (2006.01) |
| *H02P 9/00* | (2006.01) |

(52) U.S. Cl.
USPC .............. 700/287; 700/22; 290/44; 290/55; 322/36; 323/234; 416/25; 416/35

(58) Field of Classification Search
USPC ............ 700/22, 287; 290/44, 55; 322/17, 36; 323/234, 299, 304, 318; 416/1, 25–28, 416/35–37

See application file for complete search history.

(56) References Cited

U.S. PATENT DOCUMENTS 3,671,814 A    6/1972   Dick
(Continued)

FOREIGN PATENT DOCUMENTS

| CN | 1833103 A | 9/2006 |
| CN | 1873219 A | 12/2006 |
| EP | 2067989 A2 | 6/2009 |

OTHER PUBLICATIONS

Chinese Office Action; Patent Application No. 200710182379.2; dated Jan. 26, 2011; 9 pgs.
(Continued)

*Primary Examiner* — Mohammad Ali
*Assistant Examiner* — Jennifer L Norton
(74) *Attorney, Agent, or Firm* — James McGinness; Armstrong Teasdale LLP (57) ABSTRACT

A method for operating a wind turbine having at least one blade includes determining an ambient air operating envelope and controlling a power output of the wind turbine at least partially based on the determined ambient air operating envelope. Determining an ambient air operating envelope includes measuring at least one of an ambient air temperature, an ambient air pressure, an ambient air humidity, and wind turbine power output. The method also includes comparing at least one of a measured ambient air temperature, a measured ambient air humidity and a measured ambient air pressure to predetermined ambient air temperature, pressure and humidity values. The method further includes referencing the predetermined ambient air temperature, pressure and humidity values to at least one operational parameter of the wind turbine. The method also includes determining if an existing wind turbine power output is within a range associated with the determined ambient air operating envelope.

5 Claims, 4 Drawing Sheets

(56) References Cited

U.S. PATENT DOCUMENTS

| | | | |
|---|---|---|---|
| 4,193,005 | A | 3/1980 | Kos et al. |
| 4,245,181 | A | 1/1981 | Plunkett |
| 4,339,666 | A | 7/1982 | Patrick et al. |
| 4,345,198 | A | 8/1982 | Wolfinger |
| 5,083,039 | A | 1/1992 | Richardson et al. |
| 5,225,712 | A | 7/1993 | Erdman |
| 5,761,086 | A * | 6/1998 | Cranford, III .................. 702/44 |
| 6,057,622 | A | 5/2000 | Hsu |
| 6,361,275 | B1 | 3/2002 | Wobben |
| 6,525,504 | B1 | 2/2003 | Nygren et al. |
| 6,600,240 | B2 | 7/2003 | Mikhail et al. |
| 6,703,718 | B2 | 3/2004 | Calley et al. |
| 6,809,431 | B1 | 10/2004 | Schippmann |
| 6,847,128 | B2 | 1/2005 | Mikhail et al. |
| 7,011,498 | B2 | 3/2006 | Vos et al. |
| 7,023,105 | B2 | 4/2006 | Wobben |
| 7,794,209 | B2 | 9/2010 | Wobben |
| 7,857,586 | B2 * | 12/2010 | Wobben ........................... 416/1 |
| 7,942,634 | B2 * | 5/2011 | Christensen ..................... 416/1 |
| 8,057,174 | B2 * | 11/2011 | Scholte-Wassink ............ 416/35 |
| 8,183,707 | B2 | 5/2012 | Siebers et al. |
| 8,239,071 | B2 * | 8/2012 | Lausen ........................ 700/287 |
| 8,328,514 | B2 * | 12/2012 | Viripullan et al. .............. 416/35 |
| 2004/0135375 | A1 | 7/2004 | Wobben |
| 2006/0002791 | A1 | 1/2006 | Moroz |
| 2006/0112688 | A1 | 6/2006 | Vos et al. |
| 2006/0273595 | A1 | 12/2006 | Avagliano et al. |
| 2007/0018457 | A1 | 1/2007 | Llorente Gonzalez |
| 2007/0041837 | A1 | 2/2007 | Ide et al. |
| 2007/0216166 | A1 | 9/2007 | Schubert |
| 2010/0133827 | A1 | 6/2010 | Huang et al. |
| 2010/0274400 | A1 | 10/2010 | Ormel et al. |
| 2011/0309621 | A1 | 12/2011 | Nielsen et al. |

OTHER PUBLICATIONS

European Search Report issued in connection with corresponding EP application No. 10175268.1, Jul. 6, 2011.
www.frontpage.wesleyan.edu/pimms/eesmarts/docs/.../Powerinthewind.ppt (May 14, 2005).

* cited by examiner

METHODS FOR OPERATING A WIND TURBINE

CROSS REFERENCE TO RELATED APPLICATIONS

This application is a divisional application of U.S. patent application Ser. No. 11/551,884, filed Oct. 23, 2006, which is hereby incorporated by reference in its entirety.

BACKGROUND OF THE INVENTION

This invention relates generally to wind turbines, and more specifically to methods and apparatus for controlling operation of a wind turbine.

Generally, a wind turbine includes a rotor having multiple blades. The rotor is sometimes mounted within a housing, or nacelle, that is positioned on top of a base, for example a truss or tubular tower. At least some known electric utility grade wind turbines (i.e., wind turbines designed to provide electrical power to an electric utility grid) can have rotors of 30 meters (m) (98 feet (ft)) or more in diameter. The rotor blades transform mechanical wind energy into a mechanical rotational torque that drives one or more generators. The generators are sometimes, but not always, rotationally coupled to the rotor through a gearbox. The gearbox steps up the inherently low rotational speed of the turbine rotor for the generator to efficiently convert the rotational mechanical energy to electrical energy, which is fed into the electric utility grid. Gearless direct drive wind turbine generators also exist.

Seasonal changes to the ambient air conditions, for example changes to ambient air temperature and/or pressure, may affect performance of at least some known wind turbines. For example, the normal international engineering code (IEC) design envelope of a wind turbine defines loads acting on the wind energy turbine within a temperature range from about +40 degrees Celsius (° C.) (about 100 degrees Fahrenheit (° F.)) to about −20° C. (about −30° F.). Operation of a wind turbine below this temperature range may require new load calculations which will exceed the design load envelope if no countermeasures are taken, possibly resulting in the need of new, reinforced components. At least some known wind turbines, when subjected to cold weather conditions with ambient air temperature values below the lower temperature limit of the allowable temperature range, are shut off, which is disadvantageous insofar as no electric output power is generated.

Another example of seasonal changes affecting wind turbine performance is that air temperature-corrected turbine performance of at least some known wind turbines may be lower in the summer than in the winter. For example, a probability of the rotor blades of at least some known wind turbines to stall increases during summer conditions when ambient air temperatures are typically higher. Such stalling reduces a potential electric power output of the wind turbine. Moreover, reestablishment of airflow around at least some known wind turbine rotor blades after stalling may cause a short-term increase in generator speed and/or electric power output that may be difficult for a controller of the wind turbine to process. Such controller processing difficulty may increase a probability of the wind turbine to be disconnected from an electric grid due to over-speed and/or over-production conditions.

BRIEF DESCRIPTION OF THE INVENTION

In one aspect, a method for operating a wind turbine. The method includes measuring an ambient air temperature and decreasing a power output of the wind turbine if the measured ambient air temperature is below a predetermined limit to thereby facilitate reducing loads acting on components of the wind turbine.

In another aspect, a wind turbine is provided. The wind turbine includes a rotor that includes a hub and at least one rotor blade coupled to the hub. The wind turbine also includes a first sensor configured to measure ambient air temperature and generate and transmit an ambient air temperature signal. The wind turbine further includes at least one processor coupled in electronic data communication to the first sensor. The at least one processor is configured to facilitate reducing loads acting on components of the wind turbine by at least one of receiving a measured ambient air temperature signal from the first sensor and decreasing a power output of the wind turbine if the received ambient air temperature signal is below a predetermined limit.

In a further aspect, a method for operating a wind turbine having at least one blade is provided. The method includes determining an ambient air operating envelope and controlling a power output of the wind turbine at least partially based on the determined ambient air operating envelope.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
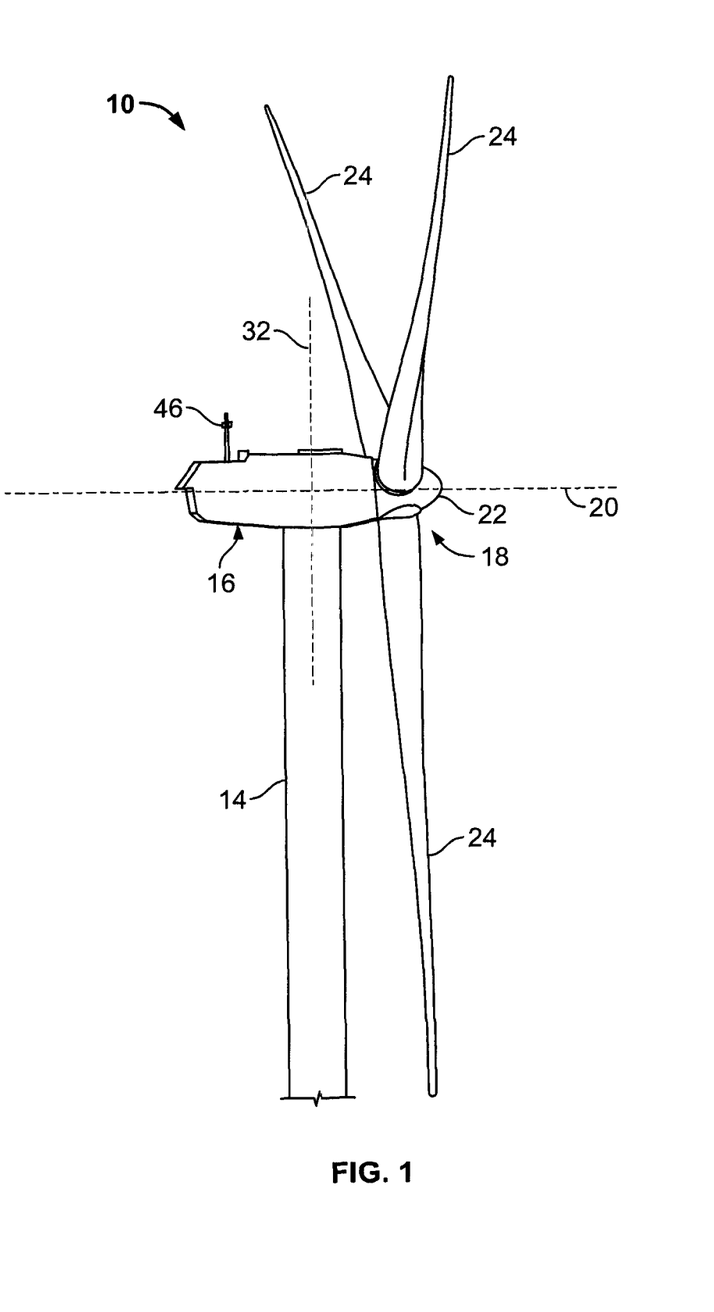
FIG. 1 is a schematic view of an exemplary wind turbine.
Figure 2:
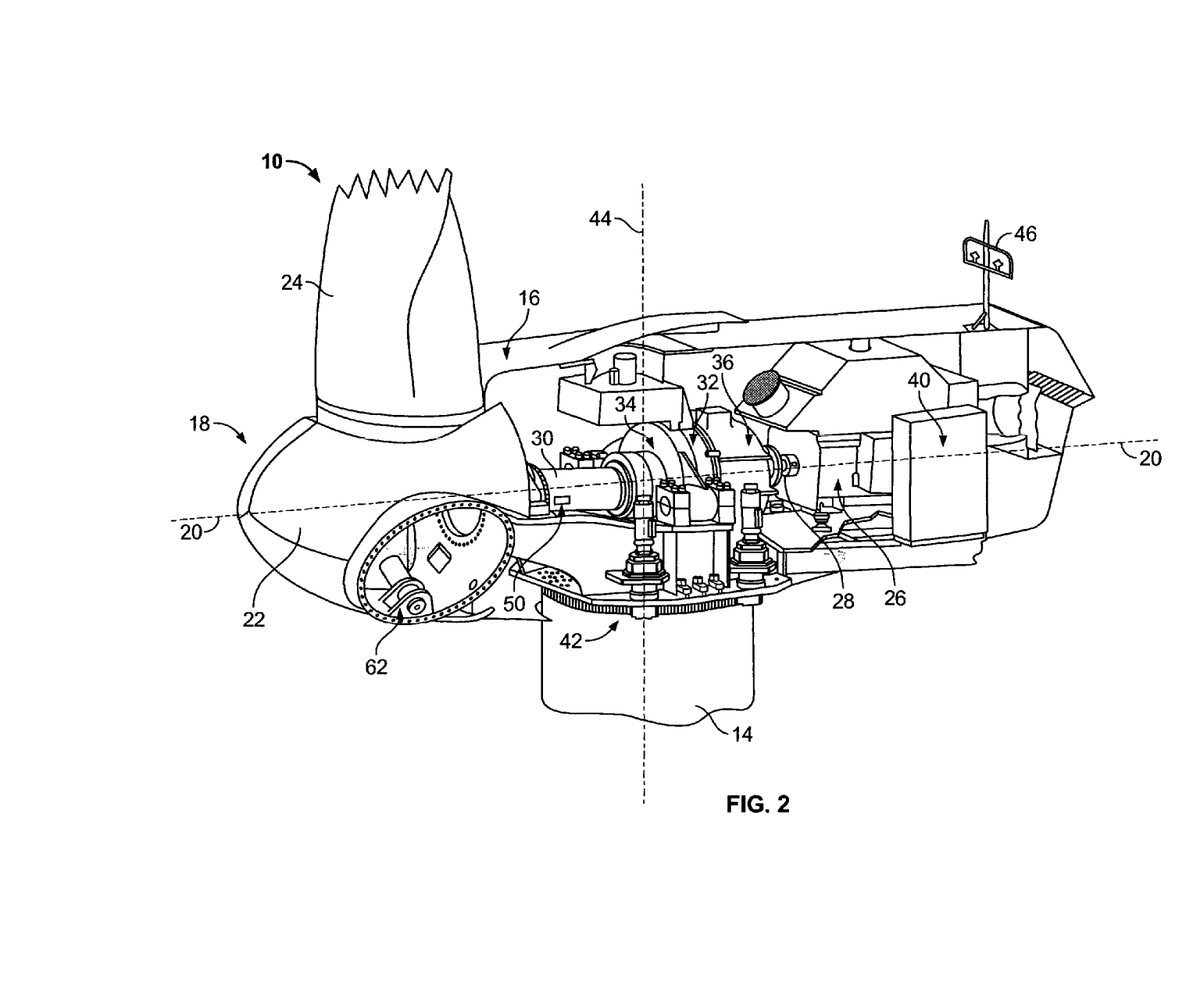
FIG. 2 is a schematic view of an exemplary nacelle that may be used with the wind turbine shown in FIG. 1.
Figure 3:
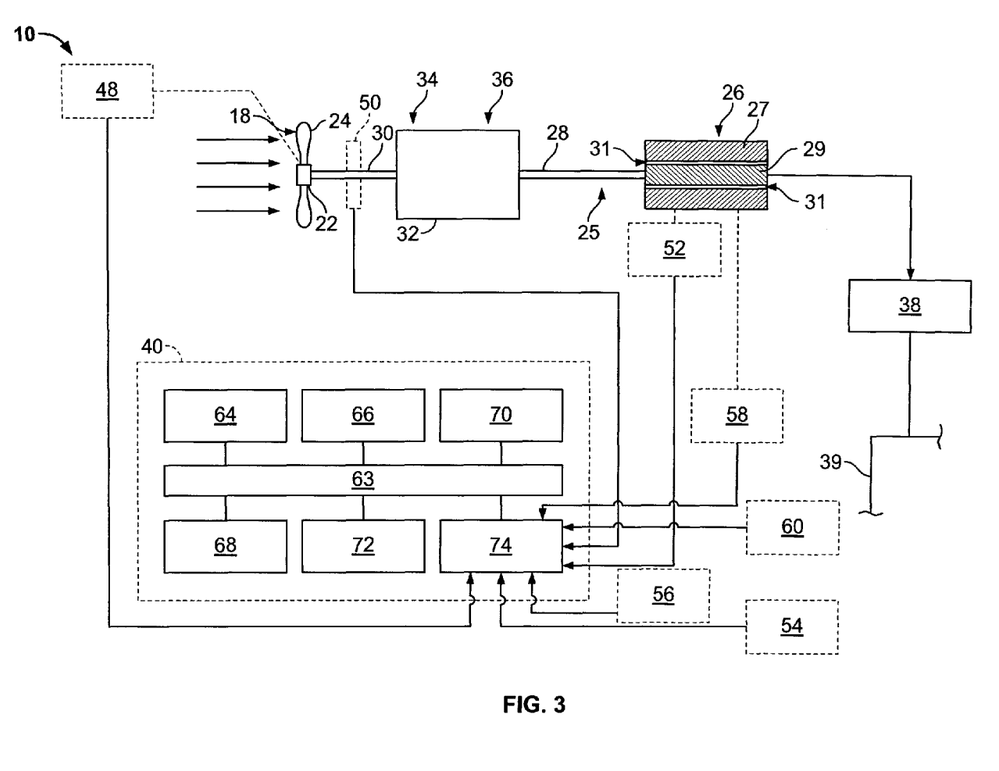
FIG. 3 is an electrical and electronic schematic diagram of the wind turbine shown in FIG. 1.

FIG. 1 is a schematic view an exemplary wind turbine 10. FIG. 2 is a schematic view of an exemplary nacelle 16 that may be used with wind turbine 10 (shown in FIG. 1). FIG. 3 is an electrical and electronic schematic diagram of wind turbine 10 (shown in FIG. 1). Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown), for receiving electrical power therefrom to drive operation of wind turbine 10 and/or its associated components and/or for supplying electrical power generated by wind turbine 10 thereto. Although only one wind turbine 10 is shown in FIG. 1-3, in some embodiments a plurality of wind turbines 10 may be grouped together, sometimes referred to as a "wind farm".

Wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. However, in some embodiments, in addition or alternative to tower-mounted nacelle 16, wind turbine 10 includes a nacelle 16 adjacent the ground and/or a surface of water. The height of tower 14 may be any suitable height enabling wind turbine 10 to function as described herein. Rotor 18 includes a hub 22 and a plurality of blades 24 (sometimes referred to as "airfoils") extending radially outwardly from hub 22 for converting wind energy into rotational energy. Although rotor 18 is described and illustrated herein as having three blades 24, rotor 18 may have any number of blades 24. Blades 24 may each have any length (whether described herein). For example, in some embodiments one or more rotor blades 24 are about 0.5 meters (m) (1.64 feet (ft)) long, while in some embodiments one or more rotor blades 24 are about 50 m (164 ft) long. Other examples of blade 24 lengths include 10 m (32.8 ft) or less, about 20 m (65.6 ft), about 37 m (121.4 ft), and about 40 m (131.2 ft). Still other examples include rotor blades between about 50 and about 100 meters long (164 ft to 328 ft).

Despite how rotor blades 24 are illustrated in FIG. 1, rotor 18 may have blades 24 of any shape, and may have blades 24 of any type and/or any configuration, whether such shape, type, and/or configuration is described and/or illustrated herein. One example of another type, shape, and/or configuration of rotor blades 24 is a ducted rotor (not shown) having a turbine (not shown) contained within a duct (not shown). Another example of another type, shape, and/or configuration of rotor blades 24 is a darrieus wind turbine, sometimes referred to as an "eggbeater" turbine. Yet another example of another type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Referring now to FIGS. 2 and 3, wind turbine 10 includes an electrical generator 26 coupled to rotor 18 for generating electrical power from the rotational energy generated by rotor 18. In the exemplary embodiment, generator 26 is a round rotor, synchronous, three-phase, permanent magnet generator that includes a generator rotor 25 and a stator 27. However, generator 26 may be any type of generator including, but not limited to, salient pole generators, double-sided stator generators, and/or doubly-fed induction generators. In the exemplary embodiment, generator rotor 25 includes a plurality of permanent magnets 29 that are coupled to generator rotor 25. Alternatively, generator rotor 25 may be a wound rotor wherein the associated windings (neither shown) are separately-excited, for example, but not limited to, a salient-pole rotor. Generator rotor 25 and stator 27 are positioned such that a clearance gap 31 (sometimes referred to as an air gap) is defined between stator 27 and generator rotor 25 with a predetermined clearance gap radial dimension (not shown). Permanent magnets 29 with predetermined polarities are positioned to generate a magnetic field (not shown) around generator rotor 25 with a predetermined number of poles and a predetermined magnetic strength.

Stator 27 includes a plurality of stator windings (not shown). Gap 31 facilitates magnetic coupling of generator rotor 25 and stator 27 to generate a predetermined voltage within stator 27 at a predetermined frequency that is determined by generator rotor 25 rotational speed as generator rotor 25 is rotated within stator 27. The generated voltages within stator 27 subsequently generate a predetermined electric current within stator 27. The electric currents generated within stator 27 subsequently generate a plurality of magnetic fields and as the magnetic field generated in generator rotor 25 rotates, the magnetic field of generator rotor 25 interacts with the magnetic fields of stator 27 through gap 31. The interaction of the magnetic fields induces magnetomotive axial and radial forces and a torque that act on generator rotor 25. The radial and axial forces and torque induced on generator rotor 25 by the interaction of the magnetic fields are proportional to the strength and position of the magnetic flux component within gap 31. As the flux component in gap 31 increases, the radial and axial forces and torque induced on generator rotor 25 increase. Similarly, as the flux component in gap 31 decreases, the radial and axial forces and torque induced on generator rotor 25 decrease. Therefore, modulating the flux modulates the radial and axial forces and torque induced on generator rotor 25.

Rotor 18 includes a rotor shaft 30 coupled to rotor hub 22 for rotation therewith. Generator 26 is coupled to rotor shaft 30 such that rotation of rotor shaft 30 drives rotation of generator rotor 25, and therefore facilitates operation of generator 26. In the exemplary embodiment, generator rotor 25 includes a rotor shaft 28 rotatingly coupled thereto and rotatingly coupled to rotor shaft 30 such that rotation of rotor shaft 30 drives rotation of generator rotor 25. In other embodiments, generator rotor 25 is directly rotatably coupled to rotor shaft 30, sometimes referred to as a "direct-drive wind turbine". In the exemplary embodiment, generator rotor shaft 28 is rotatably coupled to rotor shaft 30 through a gearbox 32, although in other embodiments generator rotor shaft 28 is rotatably coupled directly to rotor shaft 30. More specifically, in the exemplary embodiment gearbox 32 has a low speed side 34 rotatably coupled to rotor shaft 30 and a high speed side 36 rotatably coupled to generator rotor shaft 28. The torque of rotor 18 drives generator rotor 25 to thereby generate variable frequency AC electrical power from rotation of rotor 18. A frequency converter 38 is electrically coupled to generator 26 for converting the variable frequency AC to a fixed frequency AC for delivery to an electrical utility grid 39. Frequency converter 38 may be located anywhere within or remote to wind turbine 10. For example, in the exemplary embodiment, frequency converter 38 is located within a base (not shown) of tower 14.

In some embodiments, wind turbine 10 may include at least one control system 40 coupled to at least one of the components of wind turbine 10 for generally controlling operation of wind turbine 10 and/or as some or all of the components thereof (whether such components are described and/or illustrated herein). In the exemplary embodiment, control system 40 is mounted within nacelle 16. However, additionally or alternatively, control system 40 may be remote from nacelle 16 and/or other components of wind turbine 10. Control system 40 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44 for changing a yaw of rotor 18, and more specifically for changing a direction faced by rotor 18 to, for example, adjust an angle between the direction faced by rotor 18 and a direction of wind. Yaw system 42 may be coupled in electronic data communication to control system 40 for control thereby.

In some embodiments, wind turbine 10 may include anemometry 46 for measuring wind speed and/or wind direction. Anemometry 46, in some embodiments, may be coupled in electronic data communication to control system 40 for sending measurements to control system 40 for processing thereof. For example, and although anemometry 46 may be coupled in electronic data communication to control system 40 for sending measurements thereto for controlling other operations of wind turbine 10, anemometry 46 may send measurements to control system 40 for controlling and/or changing a yaw of rotor 18 using yaw system 42. Alternatively, anemometry 46 may be coupled in electronic data communication directly to yaw system 42 for controlling and/or changing a yaw of rotor 18.

Wind turbine 10 may also include a plurality of sensors 48, each coupled to a corresponding blade 24 for measuring a pitch of each blade 24, or more specifically an angle of each blade 24 with respect to a wind direction and/or with respect to rotor hub 22. Sensors 48 may be any suitable sensor having any suitable location within or remote to wind turbine 10, such as, but not limited to, optical encoders within pitch system 62 (described below). In some embodiments, sensors 48 are coupled in electronic data communication to control system 40 for sending pitch measurements to control system 40 for processing thereof.

In some embodiments, wind turbine 10 includes at least one sensor 50 coupled to rotor shaft 30 for measuring a speed of rotation of rotor shaft 30 and/or a torque of rotor shaft 30. Sensor 50 may be any suitable sensor having any suitable location within or remote to wind turbine 10, such as, but not limited to, optical encoders, digital proximity sensors, piezoelectric transducers, strain gages, and/or tachometers. In some embodiments, sensor 50 is coupled in electronic data communication to control system 40 for sending measurements to control system 40 for processing thereof. Furthermore, in some embodiments, wind turbine 10 includes at least one sensor 52 coupled to generator 26 for measuring an electrical power output of generator 26. In some embodiments, sensor 52 is coupled in electronic data communication to control system 40 for sending measurements to control system 40 for processing thereof. Sensor 52 may be any suitable sensor having any suitable location within or remote to wind turbine 10, such as, but not limited to, Hall effect current transducers (CTs) and/or capacitive voltage transducers (CVTs).

In some embodiments, wind turbine 10 includes at least one sensor 54 configured to measure ambient air pressure. Sensor 54 may be any suitable sensor having any suitable location within or remote to wind turbine 10, such as, but not limited to, electric barometric pressure measurement instruments. In some embodiments, sensor 54 is coupled in electronic data communication to control system 40 for sending ambient air pressure measurement signals to control system 40 for processing thereof.

In some embodiments, wind turbine 10 includes at least one sensor 56 configured to measure ambient air temperature. Sensor 56 may be any suitable sensor having any suitable location within or remote to wind turbine 10, such as, but not limited to, electronic thermometers. In some embodiments, sensor 56 is coupled in electronic data communication to control system 40 for sending ambient air temperature measurements to control system 40 for processing thereof.

In some embodiments, wind turbine 10 includes at least one sensor 58 configured to measure the flux generated within gap 31 and/or the torque induced on generator rotor 25. Sensor 58 may be any suitable sensor having any suitable location within generator 26, such as, but not limited to, flux measurement assemblies and/or torque measurement assemblies. In some embodiments, sensor 58 is coupled in electronic data communication to control system 40 for sending gap flux and/or generator rotor torque measurements to control system 40 for processing thereof.

In some embodiments, wind turbine 10 includes at least one sensor 60 configured to measure ambient air humidity. Sensor 60 may be any suitable sensor having any suitable location within or remote to wind turbine 10, such as, but not limited to, electronic relative humidity sensors. In some embodiments, sensor 60 is coupled in electronic data communication to control system 40 for sending ambient air humidity measurements to control system 40 for processing thereof.

Wind turbine 10 may also include one or more other sensors (not shown) coupled to one or more components of wind turbine 10 and/or the electrical load, whether such component(s) are described or illustrated herein, for measuring parameters of such component(s) and/or for measuring other ambient conditions. Such other sensor(s) may include, but are not limited to, sensors configured to measure any ambient condition, any operational parameter of any wind turbine component, displacement, yaw, pitch, moments, strain, stress, twist, damage, failure, rotor torque, rotor speed, an anomaly in the electrical load, and/or an anomaly of power supplied to any component of wind turbine 10. Such other sensors may couple to any component of wind turbine 10 and/or the electrical load at any location thereof for measuring any parameter thereof, whether such component, location, and/or parameter is described and/or illustrated herein, and may be used to derive other measurements, e.g., viscosity, as known in the art.

Wind turbine 10 includes a variable blade pitch system 62 for controlling, including but not limited to changing, a pitch angle of rotor blades 24 with respect to a wind direction. Pitch system 62 may be coupled to control system 40 for control thereby. Pitch system 62 includes one or more actuators (not shown) coupled to hub 22 and blades 24 for changing the pitch angle of blades 24 by rotating blades 24 with respect to hub 22. The pitch actuators may include any suitable structure, configuration, arrangement, means, and/or components, whether described and/or illustrated herein, such as, but not limited to, electrical motors, hydraulic cylinders, springs, and/or servomechansims. Moreover, the pitch actuators may be driven by any suitable means, whether described and/or illustrated herein, such as, but not limited to, hydraulic fluid, electrical power, electro-chemical power, and/or mechanical power, such as, but not limited to, spring force. For example, in some embodiments, the pitch actuators include a pitch drive gear (not shown) that is coupled to a pitch ring gear (not shown). The pitch ring gear is coupled to blade 24 such that rotation of the pitch drive gear rotates blade 24 about an axis of rotation (not shown) to thereby change the pitch of blade 24.

In some embodiments, the pitch actuators may be driven by energy extracted from rotational inertia of rotor 18 and/or a stored energy source (not shown) that supplies components of wind turbine 10, such as, but not limited to, control system 40 and/or pitch system 62, energy during an anomaly in electrical load 39 and/or power source coupled to wind turbine 10. For example, an anomaly in the electrical load and/or power source may include, but is not limited to, a power failure, an undervoltage condition, an overvoltage condition, and/or an out-of-frequency condition. As such, the stored energy source enables pitching of blades 24 during the anomaly. Although other stored energy sources may be used, in some embodiments the stored energy source includes hydraulic accumulators, electrical generators, stored spring energy, capacitors, and/or batteries. The stored energy sources may be located anywhere within, on, adjacent to, and/or remote from wind turbine 10. In some embodiments, the stored energy source stores energy extracted from rotational inertia of rotor 18, energy stored within a frequency converter (not shown), and/or other auxiliary energy sources such as, but not limited to, an auxiliary wind turbine (not shown) coupled to wind turbine 10, solar panels, and/or hydro-power installations.

Referring again to FIG. 3, in some embodiments, control system 40 includes a bus 63 or other communications device to communicate information. At least one processor 64 is coupled to bus 63 to process information, including information from anemometry 46, sensors 48, 50, 52, 54, 56, 58 and/or 60, and/or one or more other sensors. Control system 40 may also include at least one random access memory (RAM) 66 and/or other storage device 68. RAM 66 and storage device 68 are coupled to bus 63 to store and transfer information and instructions to be executed by processor 64. RAM 66 (and/or also storage device 68, if included) can also be used to store temporary variables or other intermediate information during execution of instructions by processor 64. Control system 40 may also include at least one read only memory (ROM) 70 and/or other static storage devices coupled to bus 63 to store and provide static (i.e., non-changing) information and instructions to processor 64. Control system 40 further includes at least one input/output device 72 may include any device known in the art to provide input data to control system 40 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Control system 40 may also include at least one sensor interface 74 that allows control system 40 to communicate with anemometry 46, sensors 48, 50, 52, 54, 56, 58 and/or 60, and/or one or more other sensors. Sensor interface 74 can be or can include, for example, one or more analog-to-digital converters that convert analog signals into digital signals that can be used by processor 64.

Figure 4:
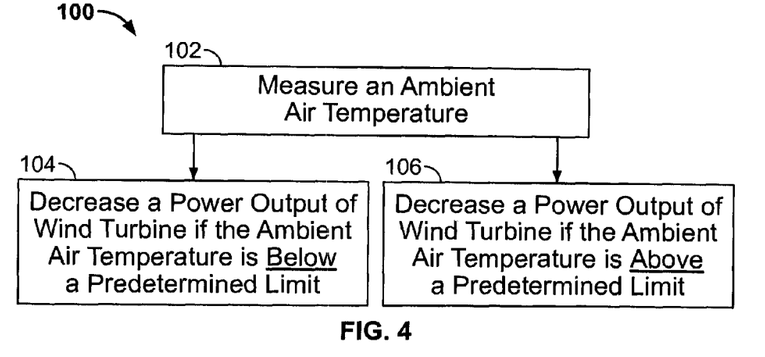
FIG. 4 is a flowchart illustrating an exemplary method for controlling the wind turbine shown in FIG. 1.

FIG. 4 is a flowchart illustrating an exemplary method 100 for controlling a wind turbine, such as, but not limited to, wind turbine 10 (shown in FIGS. 1, 2 and 3). Method 100 includes measuring 102 an ambient air temperature, for example, using sensor 56. If the ambient air temperature is below a predetermined limit, method 100 includes decreasing 104 a power output of wind turbine 10, for example using control system 40 (shown in FIGS. 2 and 3) to facilitate reducing loads acting on components of wind turbine 10. For example, as ambient air temperature decreases, loads acting on components of wind turbine 10 may increase. Moreover, and for example, a brittleness of components of wind turbine 10 may also increase as ambient air temperature decreases, which may decrease a predetermined service life expectancy and/or accelerate fatigue of components of wind turbine 10. Therefore, decreasing 104 a power output of wind turbine 10 may facilitate reducing loads acting on components of wind turbine 10 due to the colder, denser ambient air by reducing a speed of the tips of rotor blades 24 (shown in FIGS. 1, 2 and 3). As such, decreasing 104 a power output of wind turbine 10 based on the ambient air temperature may facilitate maintaining loads acting on components of wind turbine 10 within a predetermined design envelope of wind turbine 10.

The predetermined ambient temperature limit may have any value that facilitates reducing loads acting on components of wind turbine 10 due to the conditions of ambient air. For example, in some embodiments, wind turbine 10 is designed to operate within a predetermined ambient temperature up to a predetermined maximum wind speed, wherein the range extends between upper and lower temperature limits. In such embodiments, the predetermined ambient temperature limit may be the lower limit of such a predetermined temperature range. In some embodiments, and for example, the predetermined ambient temperature range is a normal international engineering code (IEC) design envelope. Examples of the predetermined ambient temperature limit include, but are not limited to, approximately +40 degrees Celsius (° C.) (about 100 degrees Fahrenheit (° F.)) to approximately −20° C. (about −30° F.).

The power output of wind turbine 10 may be decreased 104 using any suitable method, process, structure, and/or means. For example, in some embodiments, method 100 includes increasing a pitch angle of one or more rotor blades 24 of wind turbine 10 to thereby reduce a speed of the tips of rotor blades 24 and decrease 104 the power output of wind turbine 10. The blade pitch angle may be increased by any value, such as but not limited to, between about 0.1° and about 90°. An example of a normal operation angle range of wind turbine 10 is between about 0° and about 20°, while 90° is the feathered position in which no resulting torque acts on rotor 18 (shown in FIGS. 1, 2 and 3). By adjusting the pitch angle, existing components of the wind energy turbine may still usable in cold weather conditions from a load envelope perspective. For example, the pitch angle of one or more blades 24 is increased at rated wind speeds and at ambient air temperatures below the predetermined ambient temperature limit. This increase in pitch angle may help maintain wind turbine 10 within the design load envelope in cold weather conditions and at rated wind speeds. Specifically, such pitch control facilitates mitigating loads on blades 24 such that loads on blades 24 are maintained within operational parameters.

Furthermore, in some embodiments, method 100 includes decreasing a torque of generator rotor 25. Decreasing such torque may be achieved by measuring gap flux or rotor torque using sensor 58 and using control system 40 to alter the flux within gap 31 as is known in the art. For example, the gap flux may be controlled using control system 40 and/or converter 38 (shown in FIG. 3). The flux of generator 26 may be decreased to decrease a power output of wind turbine 10. For example, the flux of generator 26 may be decreased to facilitate preventing rotor blade(s) 26 from stalling and/or to facilitate reducing an occurrence of rotor blade stall due to a predetermined ambient air temperature. Stalling of one or more rotor blades 24 may decrease a power output of wind turbine 10 as well as other effects as discussed below.

According to some embodiments, output power of wind turbine 10 is decreased if the ambient air temperature is below the predetermined ambient temperature limit, which for example can be the lower temperature limit of a predetermined ambient air temperature range for which wind turbine 10 is designed. Decreasing the output power of wind turbine 10 results in a reduction of the loads acting on components of wind turbine 10 in that the speed of the tips of rotor blades 24 are reduced so as to reduce the loads, for example causing the loads to stay within the existing calculated design envelope of wind turbine 10. Considering the ambient air temperature and decreasing the output of wind turbine 10 if the ambient air temperature is below the predetermined ambient temperature limit, compensates for a potentially accelerated fatigue of the material of the individual components of wind turbine 10 due to their brittleness in cold weather conditions. Also in that the output power of wind turbine 10 is decreased, i.e. is iteratively reduced, the loads acting on components of wind turbine 10 in cold weather conditions.

As explained above, the normal IEC design envelope defines admissible loads acting on wind turbine 10 within a predetermined ambient air temperature range and up to a predetermined maximum wind speed. The loads may be defined inter alia by a calculated ambient air density. Accordingly, predetermined air densities are given in the normal IEC design envelope defining the loads on wind turbine 10. Determining the air density in cold weather conditions by measuring the ambient air temperature and pressure is advantageous to reduce the loads acting on wind turbine 10 in accordance with the calculated air density so as to stay within the admissible loads for which wind turbine 10 is configured. Thus, according to some embodiments, an air density determination can be used to effect the above-described load mitigations.

Method 100 may be advantageous since no new components of wind turbine 10 need be designed because, due to the reduction of the loads acting on wind turbine 10 in cold weather conditions, the existing design envelope of wind turbine 10 will not be exceeded.

If the ambient air temperature is above a predetermined limit, method 100 includes decreasing 106 a power output of wind turbine 10, for example using control system 40 (shown in FIGS. 1, 2 and 3) to facilitate mitigating a potential for stalling of wind turbine 10. For example, as ambient air temperature increases, a potential for detachment of air flow around blades 24 may increase. Such detachment of air flow around blades 24 may induce instabilities within operation of wind turbine 10 that include, but are not limited to, a reduction in electric power generation and/or a trip of wind turbine 10. Moreover, a sudden reattachment of wind flow around blades 18 may induce a sudden acceleration of the rotational speed of blades 18 and a sudden increase in electric power output that may exceed control parameters associated with control system 40. Such acceleration and power surge may cause a trip of wind turbine 10. Such wind speed and power transients may decrease a predetermined service life expectancy and/or accelerate fatigue of components of wind turbine 10. Therefore, decreasing 104 a power output of wind turbine 10 may facilitate reducing a potential for stall based on the ambient air temperature and may facilitate maintaining electric power generation and blade rotational speeds of wind turbine 10 within a predetermined design envelope of wind turbine 10. Examples of the predetermined ambient temperature limit include, but are not limited to, approximately +40° C. (about 100° F.) to approximately −20° C. (about −30° F.). Methods of decreasing a power output of wind turbine 10 include, but are not limited to, adjusting the associated blade pitch and adjusting generator torque, wherein both methods are described above.

Figure 5:
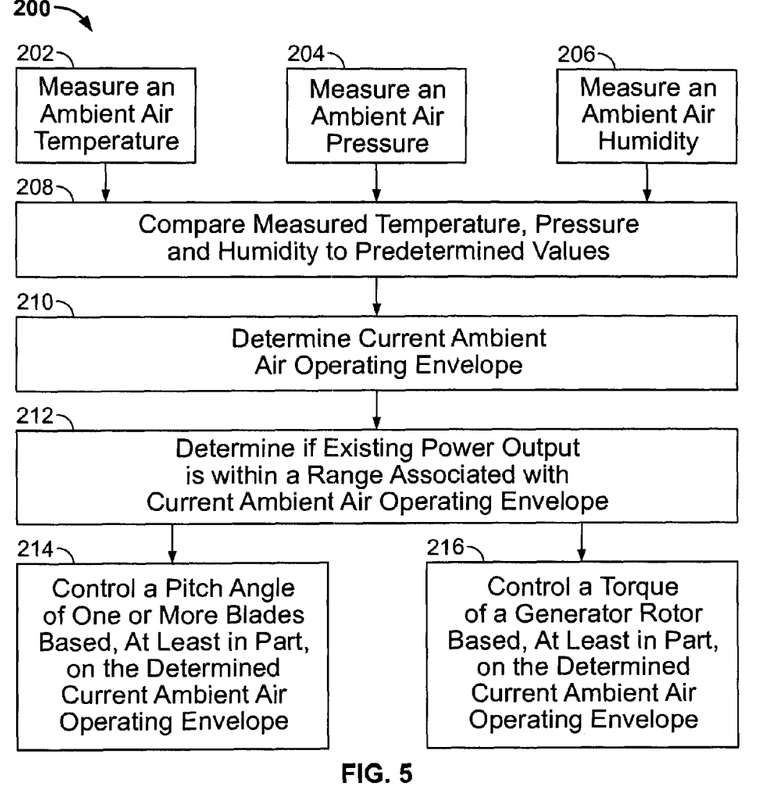
FIG. 5 is a flowchart illustrating another exemplary method for controlling the wind turbine shown in FIG. 1.

FIG. 5 is a flowchart illustrating another exemplary method 200 for controlling wind turbine 10 (shown in FIG. 1). As compared to method 100, in some embodiments, controlling a power output of wind turbine 10 is based on at least one alternate ambient air condition in addition to or in lieu of ambient temperature limits. Such alternate conditions include, but are not limited to, ambient air pressure and humidity. As such, in some embodiments, method 200 includes determining 202 an ambient air temperature, determining 204 an ambient air pressure and/or determining 206 an ambient air humidity. The ambient air pressure, temperature and humidity may be determined by directly measuring the ambient air pressure, temperature and humidity, for example using sensors 54, 56 and 60, respectively. Alternatively, additional measurements may include, but not be limited to rate of rain fall. Further, alternatively, some ambient air conditions including, but not being limited to, ambient air viscosity may be derived values based on measurements of other ambient air conditions known in the art.

Method 200 further includes comparing 208 such measured ambient air conditions that include temperature, humidity and/or pressure to a plurality of predetermined temperature, humidity and/or pressure values. Such predetermined values may be derived based on, but not being limited to, an expected altitude of wind turbine 10. In one embodiment, such values may be derived via at least one algorithm and statically stored electronically within a table (not shown) that is maintained within control system 40. Alternatively, such predetermined values may be derived dynamically using at least one algorithm. Regardless, method step 208 is performed in a continuous and dynamic manner.

Method 200 further includes determining 210 a current ambient air operating envelope for the existing ambient air conditions. In the exemplary embodiment, method step 210 is performed continuously and dynamically using at least one algorithm. Alternatively, each parameter measured and/or derived that is included within the envelope is calculated using at least one algorithm and stored statically within a table within control system 200. In the exemplary embodiment, such envelope includes a predetermined range of blade rotational speeds as well as a predetermined range of electric power generation outputs such that operation of wind turbine 10 is facilitated as described herein. Alternatively, the envelope may include any operational parameter that facilitates operation of wind turbine 10 as described herein. For example, control system 40 may calculate a blade tip speed ratio of one or more rotor blades 24 (shown in FIGS. 1, 2 and 3) of wind turbine 10 from instrument measurement signals that include, but are not limited to, a wind speed (for example measured using anemometry 46), an ambient air temperature (for example measured using sensor 56, and/or a rotor speed (for example measured using sensor 50). The tip speed ratio is typically referenced to a speed of a blade tip as compared to a free stream air flow wind velocity.

Method 200 also includes determining 212 if the existing power output is within the range associated with the current ambient air operating envelope that is determined in step 210. If the existing power output is within the envelope, typically no associated control action is transmitted from control system 40. Alternately, if the existing power output is outside of the envelope, at least one operational parameter of wind turbine 10 will be adjusted so as to adjust the power output. Such operational parameter may be associated with any component of wind turbine 10, such as, but not limited to, a pitch angle of blades 24 and the magnitude and direction of the torque acting on generator rotor 25.

For example, in some embodiments, method 200 includes controlling 214 a pitch angle of one or more rotor blades 24 based, at least in part, on the determined 210 ambient air operating envelope. For example, the pitch angle may be controlled using control system 40 (shown in FIGS. 2 and 3) and/or pitch system 62 (shown in FIG. 2). Controlling 214 a pitch angle may include increasing a pitch angle, decreasing a pitch angle, and/or maintaining a pitch angle for a predetermined period of time. The pitch angle of rotor blade(s) 24 may be controlled 214 to optimize a power output of wind turbine 10. For example, the pitch angle of rotor blade(s) 24 may be controlled 214 to optimize an angle of attack of blade(s) 24 based on a predetermined combination of ambient air conditions. Such optimization facilitates increasing a power output of wind turbine 10 and mitigating a potential of rotor blade(s) 24 stall.

Furthermore, in some embodiments, method 200 includes controlling 216 a torque of generator rotor 25 based, at least in part, on the determined 210 ambient air operating envelope. Controlling 216 such torque may be achieved by measuring gap flux or rotor torque using sensor 58 and using control system 40 to alter the flux within gap 31 as is known in the art. For example, the gap flux may be controlled using control system 40 and/or converter 38 (shown in FIG. 3). Controlling 216 such flux may include increasing the flux, decreasing the flux, and/or maintaining the flux for a predetermined period of time. The flux of generator 26 may be controlled 216 to increase a power output of wind turbine 10 as well as decrease the power output. For example, the flux of generator 26 may be controlled 216 to facilitate preventing rotor blade(s) 26 from stalling and/or to facilitate reducing an occurrence of rotor blade stall due to a predetermined combination of ambient air conditions. Stalling of one or more rotor blades 24 may decrease a power output of wind turbine 10 as well as other effects as discussed above. Moreover, such flux control may also facilitate mitigating loads on blades 24 to be maintained within operational parameters.

In some embodiments, other operational parameters and/or ambient conditions, in addition to, or alternatively to, the ambient air temperature, pressure and humidity within method 200, such as, but not limited to, an ambient air temperature profile, a wind shear profile, and/or rain events.

Exemplary embodiments are described and/or illustrated herein in detail. The embodiments are not limited to the specific embodiments described herein, but rather, components and steps of each embodiment may be utilized independently and separately from other components and steps described herein. Each component, and each step, can also be used in combination with other components and/or method steps.

When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for operating a wind turbine having at least one blade, said method comprising:
    determining an ambient air operating envelope comprises:
        measuring at least one of an ambient air temperature, an ambient air pressure, an ambient air humidity, and wind turbine power output;
        comparing at least one of the measured ambient air temperature, measured ambient air humidity and measured ambient air pressure to a predetermined ambient air temperature, predetermined ambient air pressure and predetermined ambient air humidity values; and
        referencing the predetermined ambient air temperature, predetermined ambient air pressure and predetermined ambient air humidity values to at least one of a predetermined range of blade rotational speeds and a predetermined range of wind turbine power outputs; and
    controlling a power output of the wind turbine at least partially based on the determined ambient air operating envelope.

2. A method in accordance with claim 1 further comprising determining if an existing wind turbine power output is within a range associated with the determined ambient air operating envelope.

3. A method in accordance with claim 1 wherein controlling a power output of the wind turbine comprises at least one of: controlling a pitch angle of at least one rotor blade of the wind turbine at least partially based on the ambient air operating envelope; and controlling a torque of a generator rotor of the wind turbine at least partially based on the ambient air operating envelope.

4. A method in accordance with claim 1 wherein the wind turbine is configured to withstand loads acting on the wind turbine within at least one of a predetermined ambient air temperature range, a predetermined ambient air pressure range and a predetermined ambient air humidity range, wherein each of the predetermined ambient air temperature, predetermined ambient air pressure and predetermined ambient air humidity ranges have lower and upper limits referenced to at least one of predetermined wind speed parameters and predetermined wind turbine power outputs, and wherein controlling the power output of the wind turbine at least partially based on the determined ambient air operating envelope comprises decreasing the power output of the wind turbine to facilitate withstanding loads acting thereon.

5. A method in accordance with claim 1 wherein the wind turbine is configured to mitigate stalling of the wind turbine within at least one of a predetermined ambient air temperature range, a predetermined ambient air pressure range and a predetermined ambient air humidity range, wherein each of the predetermined ambient air temperature, predetermined ambient air pressure and predetermined ambient air humidity ranges have lower and upper limits referenced to at least one of predetermined wind speed parameters and predetermined wind turbine power outputs, and wherein controlling a the power output of the wind turbine at least partially based on the determined ambient air operating envelope comprises decreasing the power output of the wind turbine to facilitate mitigating a potential for stalling thereon.

* * * * *